United States Patent

Goldstone

[15] 3,686,490

[45] Aug. 22, 1972

[54] REAL TIME SERIAL FOURIER TRANSFORMATION CIRCUIT

[72] Inventor: Bertram J. Goldstone, Lexington, Mass.

[73] Assignee: Ratheon Company, Lexington, Mass.

[22] Filed: June 2, 1970

[21] Appl. No.: 42,641

[52] U.S. Cl. ....................235/156
[51] Int. Cl. ....................G06f 7/38
[58] Field of Search .......235/156, 152; 340/15.5 DP; 324/77 G, 77 H

[56] References Cited

UNITED STATES PATENTS

| | | | |
|---|---|---|---|
| 3,573,446 | 4/1971 | Bergland | 235/156 |
| 3,588,460 | 6/1971 | Smith | 235/156 |
| 3,544,775 | 12/1970 | Bergland et al. | 235/156 UX |
| 3,517,173 | 6/1970 | Gilmartin, Jr. et al. | 235/156 |
| 3,344,349 | 9/1967 | Schroeder | 324/77 H |

OTHER PUBLICATIONS

G. Bergland, Fast Fourier Transform Hardware Implementations- An Overview IEEE Trans. on Audio & Electroacoustics June 1969 pp. 104– 108

*Primary Examiner*—Eugene G. Botz
*Assistant Examiner*—David H. Malzahn
*Attorney*—Philip J. McFarland and Joseph D. Pannone

[57] ABSTRACT

Circuitry for sampling a time varying waveform, converting each sample to a complex digital number representative of a predetermined parameter and then analyzing each one of such complex digital numbers in a plurality of stages serially to derive the Fourier transform of the original signal. The disclosed circuitry is adapted to analyzing N samples of a complex waveform, where N is an integral power of 2, but may be adapted to analyze any number of samples or any radix other than 2. Successive pairs of stages in the analyzing section of the circuitry are arranged to time-share a single digital multiplier, referred to as a productor, so as to reduce the complexity of the circuitry required to carry out the multiplication necessary in the transformation process.

1 Claim, 3 Drawing Figures

REAL TIME SERIAL FOURIER TRANSFORMATION CIRCUIT

BACKGROUND OF THE INVENTION

This invention pertains generally to digital data processing apparatus and specifically to apparatus of such general nature which is adapted to producing the discrete Fourier transform of a complex waveform.

It is known in the art that the frequency spectrum of any electrical signal may be derived by application of the Fourier transform to the signal. There have been many different types of circuits developed for this purpose. For example, as shown in detail in the patent application of George A. Works entitled "Real-Time Fourier Transformation Apparatus," Ser. No. 863,776, filed Oct. 6, 1969, now abandoned, and assigned to the same assignee as this application, a real-time Fourier transformation of a time varying signal may be accomplished by: (a) serially sampling successive portions of such a signal to derive a set of digital numbers; and (b) iteratively integrating selected pairs of such numbers in accordance with a preselected algorithm. The integration process requires, regardless of the radix system followed, the use of a separate digital multiplier circuit for each integration in the process. The complexity of the required multipliers is dependent upon the resolution desired in a particular application, i.e., the number of samples taken of the signal to be transformed and the particular radix used.

A moment's thought will make it clear that, in applications such as the processing of radar information, it is highly desirable to reduce the complexity of the processing apparatus to a minimum. For example, if a radar having a synthetic aperture is to be used for high resolution ground mapping or if a pulse radar is to be used to detect moving targets in the presence of clutter, it is apparent that a very large number of complex echo signals may be received during each range sweep. It is necessary, then, either to select the echo signals of interest by any conventional range gating technique before such signals are transformed or to transform each and every one sequentially. In either case it is necessary to be able to transform each one of the echo signals separately.

Therefore, it is a primary object of this invention to reduce the number of digital multipliers in a serial Fourier transformation circuit to a minimum.

Another object of this invention is to provide improved circuitry for processing complex waveforms to determine the frequency spectrum thereof in real time.

With such a limitation it is apparent that the complexity and number of multiplier circuits must be kept as low as possible to permit maximum speed of operation.

SUMMARY OF THE INVENTION

These and other objects of this invention are attained generally by digitally processing a batch of N samples of a complex waveform serially in pairs of stages, the processing in each such pair being carried out serially in such a manner that a single digital multiplier may be used. Upon completion of the processing N digital signals are produced sequentially, the magnitude of each such signal being representative of the frequency content of the original complex waveform.

BRIEF DESCRIPTION OF THE DRAWINGS

For a more complete understanding of this invention reference is now made to the following description of the drawings in which:

Referring now to FIG. 1, it may be seen that an exemplary pulse radar according to this invention includes a conventional transmitter 10 and receiver 11 operating through a duplexer 12 and an antenna 13 periodically to produce interrogating pulses of electromagnetic energy and echo signals corresponding to targets (not shown) illuminated by each one of such pulses. The operation of the transmitter 10 is controlled by a system trigger generator 14 of conventional construction. Operation of the system trigger generator 14 is synchronized with a clock pulse generator 15 as indicated. The latter, for example, may be a conventional crystal controlled free running pulse generator. The only restriction on the clock pulse generator 15 is that it produces output signals at substantially constant intervals at a rate corresponding to a sampling rate desired for received signals. A range gate generator 16, which also may be of conventional construction, is actuated as shown in response to each system trigger out of the system trigger generator 14 to produce a delayed gating signal during each range sweep. The output of the receiver 11 is fed to a conventional quadrature phase detector 17 which element in turn produces an "in phase" signal on line 18 and and "out of phase" signal on line 19. The former signal will be sometimes referred to hereinafter as the "real" portion of the signal and the latter will be referred to as the "imaginary" portion of the signal. The signal on line 18 is fed through an AND gate 20 to an analog-to-digital converter 21 (referred to hereinafter as A/D converter 21) while the signal on line 19 is fed through an AND gate 22 to analog-to-digital converter 23 (hereinafter referred to as A/D converter 23). A/D converter 21 and A/D converter 23 are preferably of conventional construction, each producing parallel digital words representative of the amplitude of each sampled real and imaginary portion of the signals out of the quadrature phase detector 17. Each corresponding "real" and "imaginary" word (which together describe each sampled portion of the waveform to be analyzed) is combined on line 25 and passed as a complex word to an analyzer 26. It is noted here that, for simplicity of illustration and description, the parallel digital words on the line 15 will be treated as single bits. That is, the multiplexing of the line 25 and the circuits which process and use the parallel digital words will not be shown or described, it being deemed obvious to a person of skill in the art that multiplexing of lines and circuits is required to process parallel digital words. The details of the analyzer 26 will be described hereinafter in connection with FIGS. 2A and 2B. Suffice to say here that the analyzer 26 processes the signals on line 25 so that the signals appearing on line 27 are the Fourier transform desired. The signals on line 27 are fed into a utilization device 28. The utilization device 28 may take any one of several forms. For example, if the system is to be used as a Doppler radar, the utilization device could include a conventional digital-to-analog converter and a cathode ray tube display to permit distinguishing between the Doppler shift characteristics of stationary and moving targets and providing a display of moving targets if desired.

Figure 1:
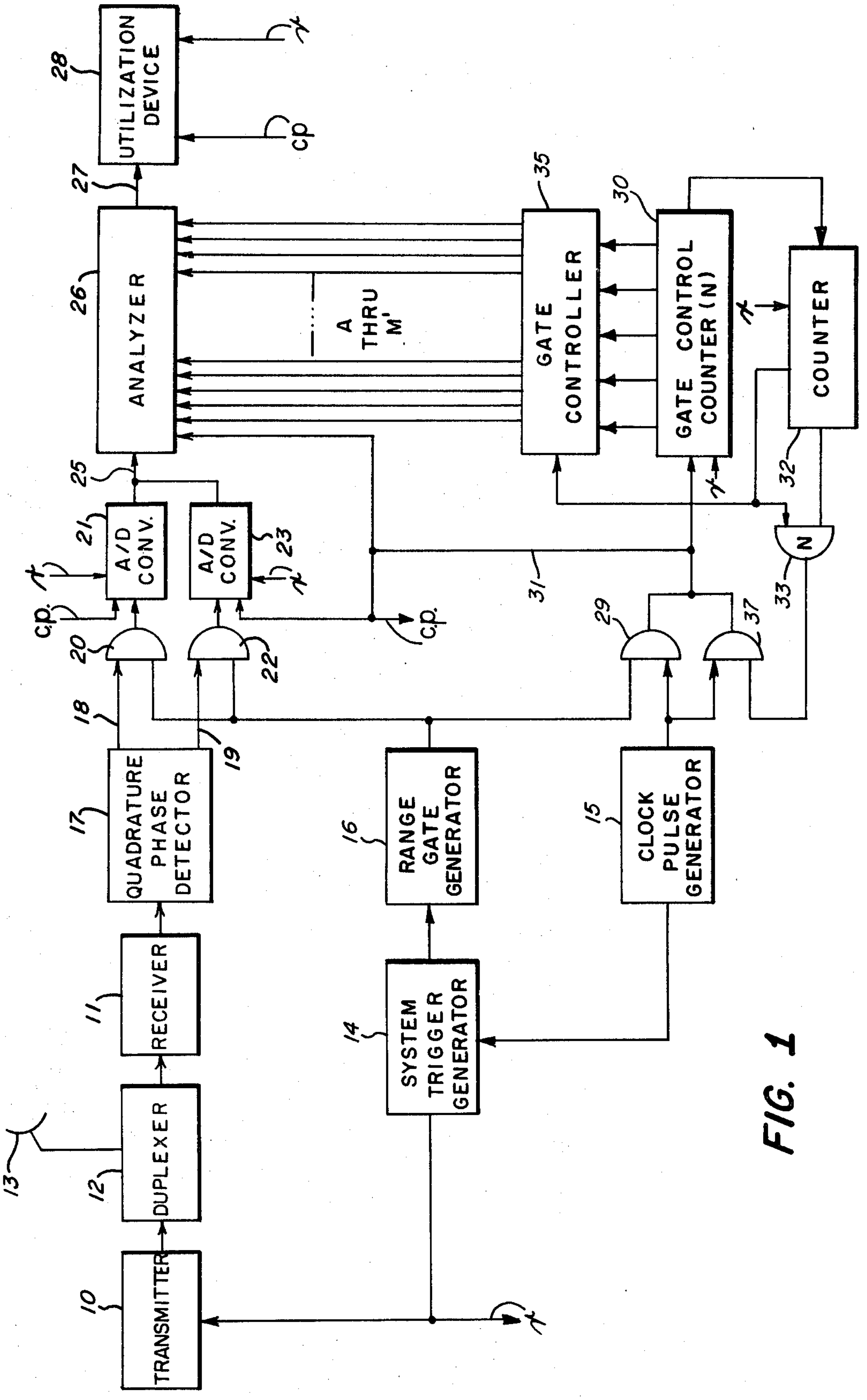
FIG. 1 is a block diagram, somewhat simplified, of a radar incorporating the transformation circuitry of this invention.

The signal out of the range gate generator 16 enables an AND gate 29, thereby permitting pulses out of the clock pulse generator to pass to a gate control counter 30 and, via line 31, to the various elements which in the drawings receive a "c.p." input. The gate control counter 30 may be a conventional binary counter, the number of stages being equal to the total number of samples (here 16) taken of the signal to be transformed. The final stage of the gate control counter 30 is fed to a counter 32 which here is a two stage binary counter. The second stage of the counter 32 is connected to one input of a NAND gate 33 while the first stage of the counter 32 is connected to the second input of such gate and to a gate controller 35. The output of the NAND gate 33 is connected to enable an AND gate 37 which, as is AND gate 29, is arranged to pass clock pulses when enabled. The gate controller 35 preferably is a conventional diode matrix which provides enabling signals on the lines labeled A through M′ for reasons which will become clear hereinafter. It will be noted here that the operation of the AND gates 29, 37 is such that a first group of 16 pulses from the clock pulse generator 15 pass through AND gate 29 and a second group of 16 pulses immediately following the first group pass through AND gate 37. The result is that the gate control counter 30 is cycled twice each time the range gate generator is is actuated for reasons which will become clear hereinafter.

Figure 2:
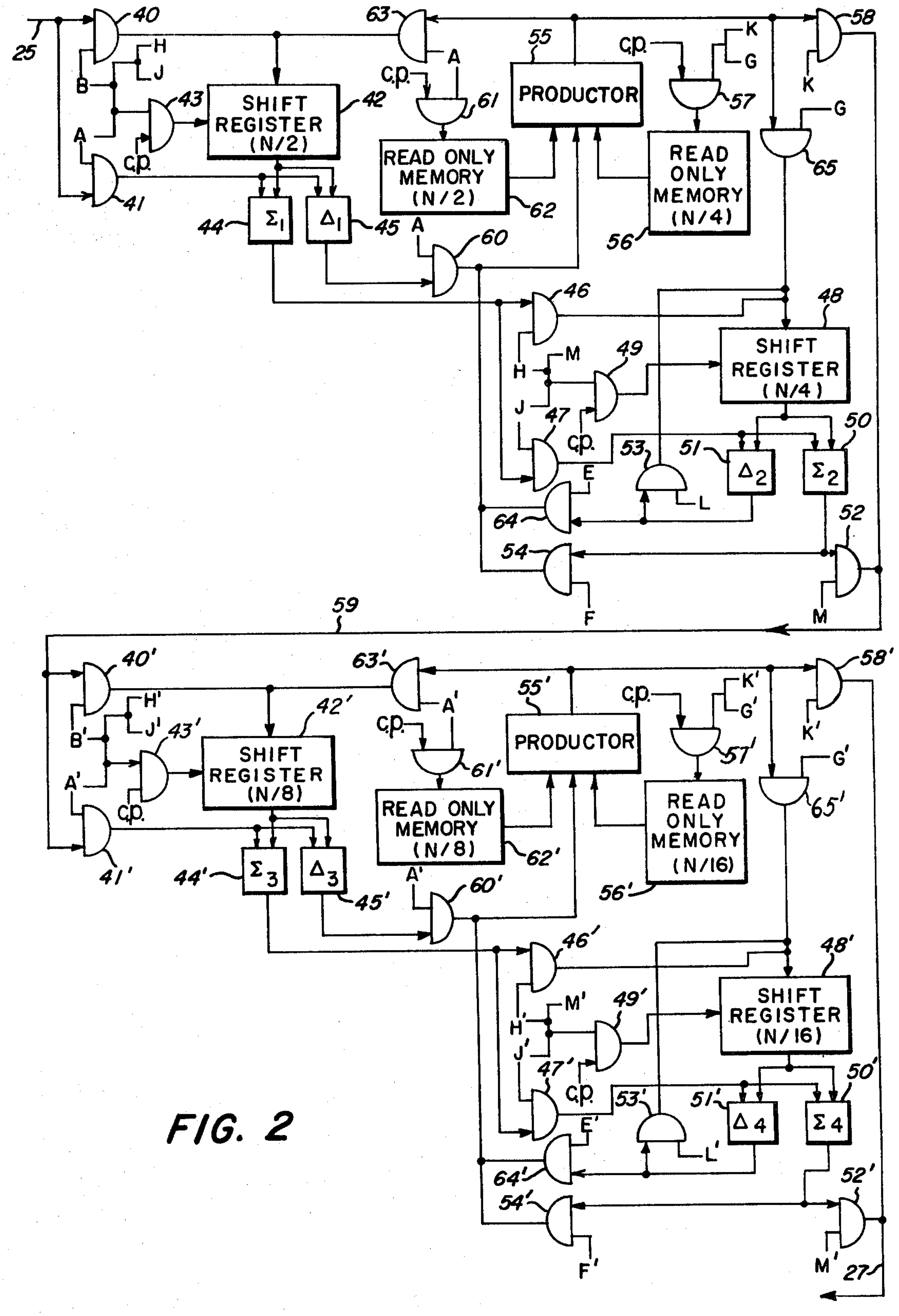
FIG. 2 is a block diagram showing the control logic of an analyzer according to this invention.
Figure 2A:
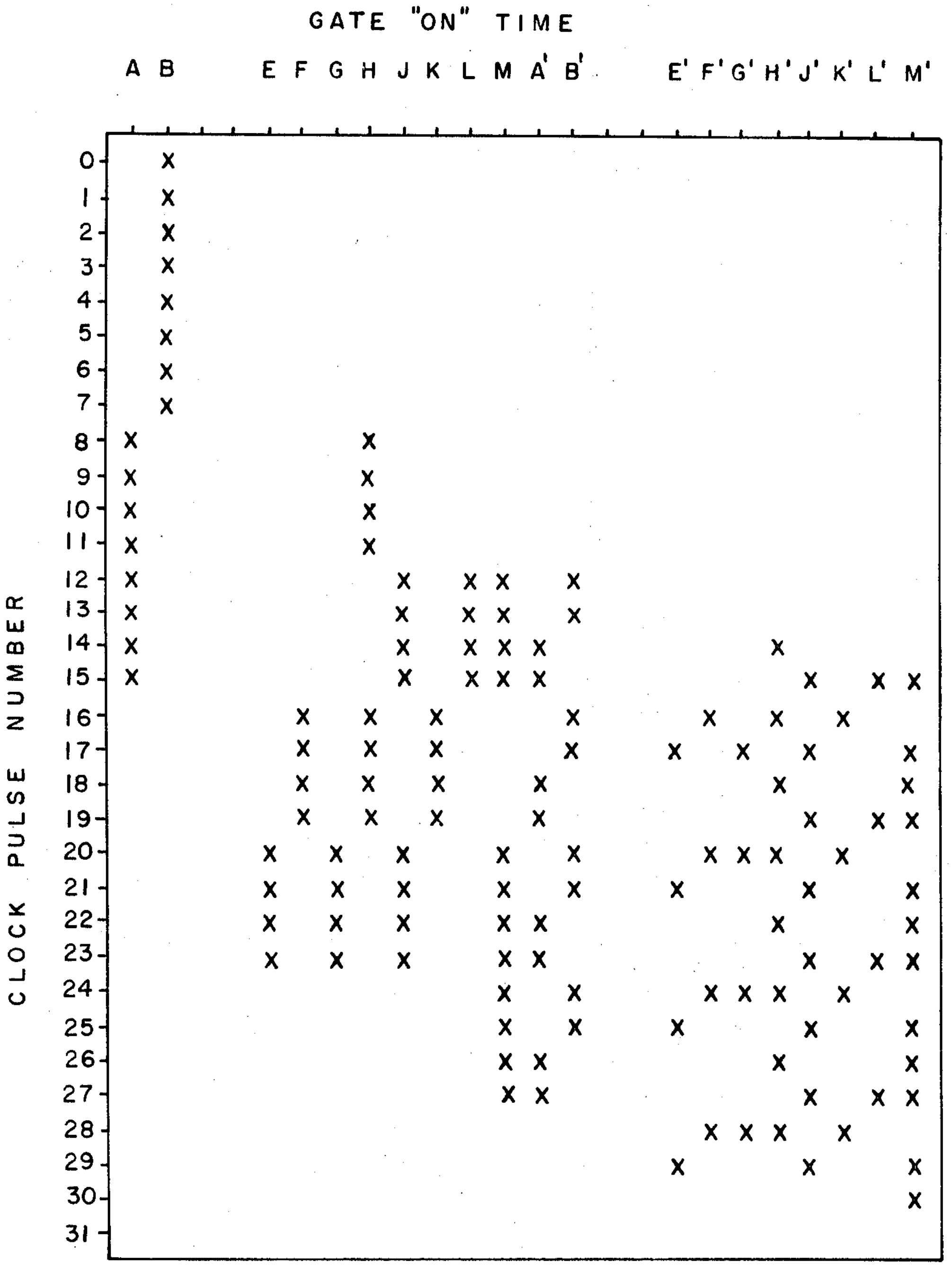
FIG. 2A is a table outlining the time sequence of the operation of the logic circuits shown in FIG. 2.

Referring now to FIGS. 2 and 2A, the construction and operation of the analyzer 26 may be seen. It should be noted that the structure illustrated has been selected to demonstrate the processing of a batch of N, here 16, samples with a radix of 2. As noted hereinbefore, each sample is a parallel digital number having a "real" portion and an "imaginary" portion. Each such number describes a different one of the samples of the waveform to be transformed, the precision of description being dependent on the number of bits used. In this connection it is noted that the circuitry has been shown for processing a single bit number, it being deemed to be obvious to multiplex the various elements to permit processing of multi-bit digital numbers. The complex digital words on line 25 are led to AND gates 40, 41. The latter is enabled during the 9th to the 16th clock pulse out of the clock pulse generator 15 of FIG. 1, i.e., during time "A" as indicated in FIG. 2A. The former is enabled during the first to the 8th clock pulse out of the clock pulse generator 15 of FIG. 1, i.e., during time "B" as indicated in FIG. 2A. When AND gate 40 is enabled the signals then on line 25 are passed to a shift register 42. An AND gate 43 which, as is shown, is enabled during both times "A" and "B" passes clock pulses to the shift register 42. Such pulses serve as shift pulses for the shift register 42. The number of stages in the shift register 42 is equal to the number of digital words passing through AND gate 40, here 8. It follows then that the first digital word through the AND gate 40 appears at the output of the shift register at the time the ninth digital word passes through the AND gate 41, the two then being impressed on the input terminals of a summing circuit 44 and a differencing circuit 45 as shown. These circuits preferably are conventional in construction. It follows that the digital signals out of the summing circuit 44 are the sum of first the 1st and 9th words in the train on line 25, the 2nd and 10th, 3rd and 11th, etc. The digital signals out of the differencing circuit 45 are, similarly, the difference between the 1st and 9th words in the train on line 25, the 2nd and 10th, etc.

The digital signals out of the summing circuit 44 are led to AND gates 46, 47, the former being enabled at time H and the latter at time J as indicated in FIG. 2. The first four digital signals out of the summing circuit 44 are fed, via a shift register 48, to a summing circuit 50 and a differencing circuit 51. The number of stages in shift register 48 is equal to one-quarter the number of samples of the signal on line 25. The first one of the digital signals out of the shift register 48 is, therefore, in synchronism with the first one of the digital signals through the AND gate 47 at the input terminals of the summing circuit 50 and the differencing circuit 51. Succeeding pairs of digital signals out of the shift register 48 and the AND gate 47 are similarly synchronized. Clock pulses to shift the digital signals through the shift register 48 are provided through an AND gate 49, which is enabled during both times H and J as indicated. The digital signals out of the summing circuit 50 are fed through an AND gate 52, which as indicated is enabled at time M, to line 59. The signals out of the differencing circuit 51 are fed, via an AND gate 53 which is enabled at time L as indicated, back into the input of the shift register 48. The AND gate 49, which is then enabled as indicated, passes clock pulses to the shift register 48 to cause the digital signals from the AND gate 53 to be shifted through the shift register 48 to appear again at the input of the summing circuit 50 and the differencing circuit 51. At this time, however, AND gate 47 is disabled so only the recirculated digital signals are impressed on the summing circuit 50 and the differencing circuit 51. The digital signals out of the differencing circuit 51 are dissipated. The digital signals from the summing circuit 50 are fed to an AND gate 54 (AND gate 52 then being disabled), passing therethrough to a productor 55. The output of a "read only" memory 56 which is actuated by clock pulses during times K, G through an AND gate 57 is also fed to the productor 55. The "read only" memory is here a conventional diode encoding matrix which produces a different digital signal output for each clock pulse impressed on it. The productor 55 is here a conventional binary signal multiplier which is responsive to a "multiplicand" (the digital signals from the "read only" memory 56) to produce a product signal which is impressed on a then enabled AND gate 58. The digital signals passing through AND gate 58 are then passed over line 59 immediately following the digital signals which were passed through and AND gate 52.

Referring back now to the output signals from the differencing circuit 45 it may be seen that such signals are passed through an AND gate 60 to become, during time A, the "multiplicand" of the signals applied to the productor 55. Simultaneously, because AND gate 61 is then enabled as indicated, a "multiplier" is applied to the productor 55 from a "read only" memory 62. The product signal out of the productor 55 is applied to the enabled AND gate 63 to the input of the shift register 42. It will be observed that the first of the digital signals passing through the AND gate 63 follows the last signal in the shift register 42 from the AND gate 40 by one clock pulse. The shift register 42, because it has shift pulses applied to it during the times H, J, simply delays the digital signals from the AND gate 63 by 8 counts, applying the so-delayed signals to the summing circuit 44. The output signals of the summing circuit 44, which are, at the time being discussed, a replica of the signals out of the shift register 42 because AND gate 41 is then disabled, are applied to AND gates 46, 47. The latter gates, being enabled respectively at times H and J, cause the first half of the digital signals out of summing circuit 44 to be delayed in passing through the shift register 48 to coincide with the last half of such signals at the input of the summing circuit 50 and the differencing circuit 51. The output of the summing circuit 50 is passed through the then enabled AND gate 52 to the line 59. The output of the differencing circuit 51 is applied to an AND gate 64 which is enabled at time E as indicated, passing through such gate to become the "-multiplicand" signal applied to the productor 55. The "read only" memory 56 is actuated simultaneously with such to provide "multiplier" signals to the productor 55. The product signals out of the productor 55 are fed through a then enabled AND gate 65 to the input of the shift register 48. The latter element, in response to shift pulses applied thereto, delays such signals for four clock pulses before application thereof to the summing circuit 50 and then, via the AND gate 52, to line 59.

Summarizing the foregoing, the partially processed digital signals on line 59 consist of four serially occurring groups of digital signals, each such group containing four serially occurring digital signals. The first one of such groups consists of the digital signals resulting from summing in both the summing circuits 44, 50; the second group consists of digital signals resulting from summing in the summing circuit 44, then differencing in the difference circuit 51 and weighting, in the productor 55, each one of the resulting difference signals in accordance with the weighting factors out of the read-only memory 56; the third group consists of digital signals resulting first from differencing in the differencing circuit 45 and weighting, in the productor 55, each one of the resulting difference signals in accordance with weighting factors out of the read-only memory 62 and then adding in the summing circuit 50; and the last group consists of digital signals resulting from differencing in the differencing circuit 45, weighting in the productor 55 in accordance with weighting factors out of the read-only memory 62 and a second differencing in the differencing circuit 51 and weighting in the productor 55 in accordance with weighting factors out of the read-only memory 56.

The weighting factors produced, respectively, by the read-only memories 56, 62, 56′ and 62′ for the application being discussed, are as follows:

| Clock Pulse Number | read-only memory 62 | read-only memory 56 | read-only memory 62′ | read-only memory 56′ |
|---|---|---|---|---|
| a | 1 | 1 | 1 | 1 |
| b | $\omega$ | $\omega^2$ | $-j$ | — |
| c | $\omega^2$ | $-j$ | — | — |
| d | $\omega^3$ | $-j\,\omega^2$ | — | — |
| e | $-j$ | — | — | — |
| f | $-j\,\omega$ | — | — | — |
| g | $-j\,\omega^2$ | — | — | — |
| h | $-j\,\omega^3$ | — | — | — |

where $\omega = \cos(2\pi/16) - j\sin(2\pi/16)$
and $j = \sqrt{-1}$

It is noted here that the designation of clock pulse number in the foregoing tabulation refers to clock pulses impressed on each read-only memory during the time in which the AND gate that controls each such memory is enabled.

The four groups of partially processed digital signals on line 59 are fed into AND gates 40′, 41′. These gates and the remaining elements shown in the lower portion of FIG. 2 correspond element for element with similarly numbered elements of FIG. 2, differing only as indicated in capacity of shift registers 42′, 48′ and read-only memories 56′, 62′. The enabling signals to the various AND gates in the lower portion of FIG. 2 also differ, as indicated in FIG. 2A, from the heretofore mentioned enabling signals to each corresponding gate in the upper portion of FIG. 2. Because of the difference in capacity of the shift registers 42′, 48′ and the read-only memories 56′, 62′ and the timing of the enabling signals to the various gates in the lower portion of FIG. 2, the four partially processed digital signals in each one of the four groups thereof on line 59 are operated upon to produce, on line 27, a corresponding number of completely processed signals. Thus, taking the first group of partially processed digital signals as an example, it will be recalled that the four signals in such group result from two successive summing operations in summing circuits 44, 50. Specifically, such digital signals are: (a) the sum of the 0th, 8th, 4th and 12th complex numbers on line 25; (b) the sum of the 1st, 9th, 5th and 13th complex numbers on line 25; (c) the sum of the 2nd, 10th, 6th and 14th complex numbers on line 25; and (d) the sum of the 3rd, 11th, 7th and 15th complex numbers on line 25. The sum of (a), (b), (c) and (d), i.e., the sum of all complex numbers on line 25, is the first signal appearing on line 27 by reason of the two successive summing operations in summing circuits 44′, 50′. The difference between the sum of (a) and (c) and the sum of (b) and (d), weighted by the weighting factor of read-only memory 48′ in productor 55′, is the second signal appearing on line 27 by reason of a summing operation in summing circuit 44′ and a differencing operation in differencing circuit 51′. The sum of the difference between (a) and (c) and the difference between (b) and (d), each difference being weighted by the first weighting factor of read-only memory 62′ in productor 55′, is the third signal appearing on line 27 by reason of a differencing operation in differencing circuit 45′ and a summing operation in summing circuit 50′. The difference between the difference between (a) and (c) and the difference between (b) and (d), each such difference signal being weighted, respectively, by the second weighting factor out of read-only memory 62′ and the weighting factor out of read-only memory 56′ in productor 55′ is the fourth signal on line 27 by reason of a differencing operation in both differencing circuits 45', 51'. In like manner each following group of partially processed digital signals on line 59 are operated upon with the final result that 16 signals appear successively on line 27 which, when considered as a whole, represent the discrete Fourier transform of the signals appearing on line 25.

It is noted here that, as is clearly shown in FIG. 2A, the disclosed circuit completes the desired transformation of 16 samples of a time-varying signal within a time period equal to twice the time required to obtain the 16 samples and that, further, transformation of a different group of 16 samples may be initiated as soon as the last one of the first group has been initiated. If the number of stages is changed to permit N samples to be transformed (where N is an integral power of 2 and the radix for computation is 2), the processing still would be completed in twice the time required for sampling and a group of N samples immediately preceding or following the group being processed may be processed. That is, contiguous sets of N samples may be processed continuously with a transport lag of N sample times.

It is also noted that the disclosed analyzer is adapted, by simply changing the sign of the weighting factor in each one of the read-only memories, to perform the inverse discrete Fourier transform. That is, the analyzer shown in FIG. 2 may be operated to transform a set of complex digital numbers descriptive of the frequency spectrum of a signal into a like set of complex digital numbers representative of a time-varying electrical signal provided only that the sign of each weighting factor is reversed.

It is also noted that the disclosed analyzer may be used, without change, to convolve discrete Fourier transforms. Thus, for example, if it is desired to multiply two discrete Fourier transforms the disclosed analyzer would be operated as described hereinbefore sequentially to produce the discrete Fourier transforms to be multiplied. The first such transform to be produced would then be stored in the utilization device until the second one is produced and then the two could be multiplied.

Having described a preferred embodiment of this invention wherein the number of productors, or digital multipliers, is reduced as compared with known digital Fourier transform circuits, it will be apparent to those of skill in the art that changes may be made in such embodiment without departing from the inventive concepts. For example, it is evident that the four different "read-only" memories shown herein may be combined into a single "read-only" memory if one wishes to provide appropriate control circuits to such a memory. Additionally, AND gates 43, 43', 49, 49' may be eliminated if desired, with clock pulses being fed continuously to each one of the shift registers 42, 42', 48, 48'. Further, it is evident from FIG. 2A that, if appropriate control circuitry is provided, the shift registers, summing and differencing circuits, the productor and "read-only" memories of the first two stages are all that is required to completely process 16 samples, it being necessary only to delay the signals on line 59 by four clock pulses and then recycle the partially processed digital signals through the two stages.

Still further, it is evident that although this invention has been illustrated as a portion of a radar system, the analyzer itself may be used in any circuit, as a spectrum analyzer, which is used to determine the frequency content of complex time-varying signals.

It is felt, therefore, that this invention should not be restricted to the proposed embodiment, but rather should be limited only by the spirit and scope of the following claims.

What is claimed is:

1. In digital processing apparatus for processing a time series of N complex digital numbers, where "N" equals $2^r$ and "$r$" is an even positive integer, successively to derive each one of the N coefficients of the discrete Fourier Transform of such time series, each one of such coefficients being a different combination of the partial sums and weighted partial differences of the N complex digital numbers, such apparatus including $r/2$ pairs of successive processing stages, each one of such stages being adapted first to produce partial sums and partial differences between selected ones of the N complex digital numbers and then to weight the partial differences serially to produce, at the output of the last one of the successive processing stages, the desired N coefficients, the improvement comprising:
   a. $r/2$ weighting means, each including a digital multiplier disposed in circuit between the processing stages in each one of the $r/2$ pairs thereof, for weighting the partial differences out of each one of the successive processing stages; and
   b. $r/2$ control means, each one operative on the second processing stage in each one of the $r/2$ pairs thereof, for delaying selected ones of the partial differences from such processing stage until the partial differences from the associated first processing stage have been passed through the associated digital multiplier.

* * * * *